(12) United States Patent
Burkhard et al.

(10) Patent No.: US 6,863,048 B2
(45) Date of Patent: Mar. 8, 2005

(54) VACUUM SYSTEM FOR ENGINE WITH VARIABLE VALVE LIFT

(75) Inventors: James F. Burkhard, Churchville, NY (US); Brian K. Allston, Rochester, NY (US); John S. Lylak, Jr., Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 181 days.

(21) Appl. No.: 10/170,851

(22) Filed: Jun. 12, 2002

(65) Prior Publication Data

US 2003/0230279 A1 Dec. 18, 2003

(51) Int. Cl.⁷ .............................. F02D 11/10; F01L 9/04
(52) U.S. Cl. ..................... 123/325; 123/90.15; 123/399
(58) Field of Search ........................... 123/90.11, 90.15, 123/295, 325, 348, 399, 493

(56) References Cited

U.S. PATENT DOCUMENTS

| 4,608,825 | A  | * | 9/1986  | Fontaine ....................... 60/545 |
|-----------|----|---|---------|-----------------------------------------|
| 5,826,559 | A  | * | 10/1998 | Ichimoto et al. ............. 123/295    |
| 6,250,283 | B1 | * | 6/2001  | Russell et al. ............... 123/361   |
| 6,397,814 | B1 | * | 6/2002  | Nagaishi et al. ............. 123/348    |
| 6,412,455 | B1 | * | 7/2002  | Ogiso et al. .............. 123/90.11    |
| 6,439,175 | B2 | * | 8/2002  | Arai et al. ................ 123/90.11   |
| 6,571,782 | B2 |   | 6/2003  | Brosseau et al.                          |

* cited by examiner

*Primary Examiner*—Tony M. Argenbright
(74) *Attorney, Agent, or Firm*—Jimmy L. Funke

(57) ABSTRACT

A vacuum system for an engine with variable valve lift includes a controllable vacuum-forming valve at the entrance to the intake manifold and a programmable engine control module (ECM) to increase vacuum as desired within the manifold by modulating the valve as needed to optimize fuel economy. To provide vacuum brake assist, a brake booster diaphragm is connected conventionally to the manifold and a vacuum storage tank and check valve are disposed between the booster diaphragm and the manifold. During periods of vehicle deceleration, when engine load is low, the ECM may switch the VVL-controlled intake valves to a higher lift to increase the pumping capacity of the engine, while simultaneously partially closing the vacuum-forming valve to create vacuum in the intake manifold, the brake booster, and the vacuum storage tank at little or no expense to engine performance.

2 Claims, 2 Drawing Sheets

US 6,863,048 B2

VACUUM SYSTEM FOR ENGINE WITH VARIABLE VALVE LIFT

TECHNICAL FIELD

The present invention relates to internal combustion engines; more particularly, to such engines wherein devices for variably controlling the lift of intake valves are the primary throttling means of the engine; and most particularly, to a system for providing manifold vacuum in such an engine for improving fuel economy and for operating vacuum-assisted devices such as a brake booster.

BACKGROUND OF THE INVENTION

Fuel-injected internal combustion engines are well known, especially for automotive applications. Torque output of such an engine is typically controlled by moderating airflow into the engine via a throttle device. The throttle, usually a butterfly valve disposed at the entrance to the engine intake manifold, may be directly actuated by a driver's foot pedal or may be electronically governed through a digital or analog controller. Under typical driving conditions, the engine is substantially throttled, creating a vacuum in the intake manifold.

Recently, some engines are known to be provided with means for varying the lift of one or more engine cylinder intake valves to improve fuel economy (also known as variable valve lift, VVA, and referred to herein as variable valve lift, VVL). Typically, the lift of a plurality of valves in a multiple-cylinder engine is reduced during operating periods of low engine load to reduce fuel consumption, the amount of lift being directed by an engine control module (ECM) responsive to various performance inputs, operator pedal position, and programmed algorithms.

In some such engines, it is possible to control engine torque by utilizing the variable valve lift function to controllably throttle the flow of air into each of the individual cylinders, thereby obviating the need for any conventional throttle valve at the inlet to the intake manifold.

A first unfavorable consequence of eliminating a manifold throttle valve is that the air pressure within the manifold is substantially the same as atmospheric pressure outside the engine; i.e., there is no useful level of manifold vacuum. However, a variety of standard engine and other automotive subsystems have evolved over many years which utilize vacuum as the source of actuation. The engine intake manifold has previously been a "free" source of vacuum for operating such devices and functions, which may include brake boosting, evaporative canister purging, exhaust gas recirculation, and HVAC systems among others. Providing an auxiliary vacuum pump for these devices adds cost to a vehicle, consumes valuable onboard space, and parasitically decreases fuel economy.

A second unfavorable consequence of eliminating a manifold throttle valve is that fuel economy may be sub-optimal when there is no manifold vacuum.

It is a principal object of the present invention to provide a substantially non-parasitic system of vacuum for operating vacuum-assisted devices in a vehicle powered by a VVL-equipped engine wherein primary throttling is provided by variable valve lifting.

It is a further object of the invention to provide such a system whereby fuel economy is improved.

SUMMARY OF THE INVENTION

Briefly described, a vacuum system for an engine with variable valve lift includes a controllable vacuum-forming valve at the entrance to the intake manifold and a programmable engine control module (ECM) to increase vacuum within the manifold as needed and preferably only when it can be done without impairing fuel economy or engine performance. Vacuum may then be used for any of various vacuum-assisted functions, for example, boosting a vehicle braking system. A brake booster diaphragm is connected conventionally to the manifold; however, because manifold vacuum varies, a vacuum storage tank and check valve are disposed between the booster diaphragm and the manifold. A brake pedal switch notifies the ECM when vacuum is needed to assist the brake diaphragm. A brake pressure sensor informs the ECM of actual vacuum level available at the booster diaphragm. Under certain engine operating conditions, the ECM may switch the VVL-controlled intake valves to a higher lift, thereby increasing the pumping capacity of the engine, while simultaneously partially closing the vacuum-forming valve, thus creating substantial vacuum in the intake manifold and the brake booster and vacuum storage tank at little or no expense to engine performance. In the unusual event that there is inadequate vacuum available for braking, the ECM instantly switches the engine to conventional mode, wherein the valves are put at full lift and the vacuum-forming valve acts as a conventional throttle valve, thus creating vacuum immediately in the intake manifold at the temporary expense of fuel economy.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
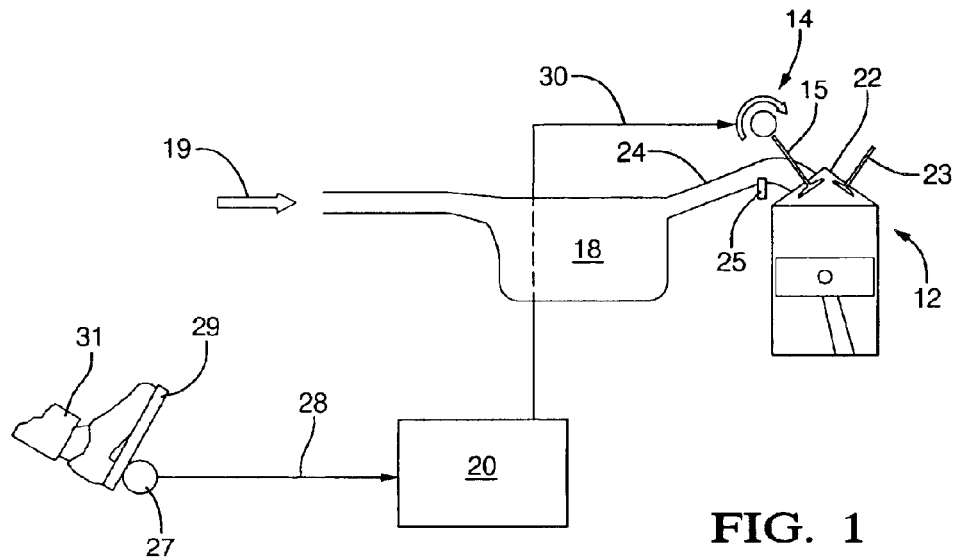
FIG. 1 is a schematic diagram of a known VVL-equipped fuel-injected internal combustion engine wherein the primary throttle means is the variable valve lift means.

Referring to FIG. 1, a fuel-injected engine 12 with variable valve lift (VVL) means 14 for actuation of intake valve 15 includes a programmable engine control module 20 (ECM). (It should be understood that engine 12 is a multiple-cylinder engine and that valve 15 is individually representative of a plurality of engine valves in a plurality of engine cylinders.) Intake manifold 18 is connected for air flow 19 to engine head 22 via runner 24 which supports a conventional fuel injector 25. Head 22 supports intake valve 15 and exhaust valve 23. The ECM is electrically connected to VVL means 14 via first lead 30 for varying the lift of intake valve 15. Primary engine throttling and consequent torque control is provided by varying the lift of the intake valves via ECM 20 in response to engine load request from an electronic pedal module 27 connected via second lead 28 and responsive to positional input of accelerator pedal 29 from operator 31. ECM 20 is further connected to other engine and vehicle inputs (not shown) as are well known in the automotive arts and is further programmed with algorithms for determining the instantaneous performance of engine 12. Typically, during operation there is substantially no vacuum in manifold 18.

Figure 2:
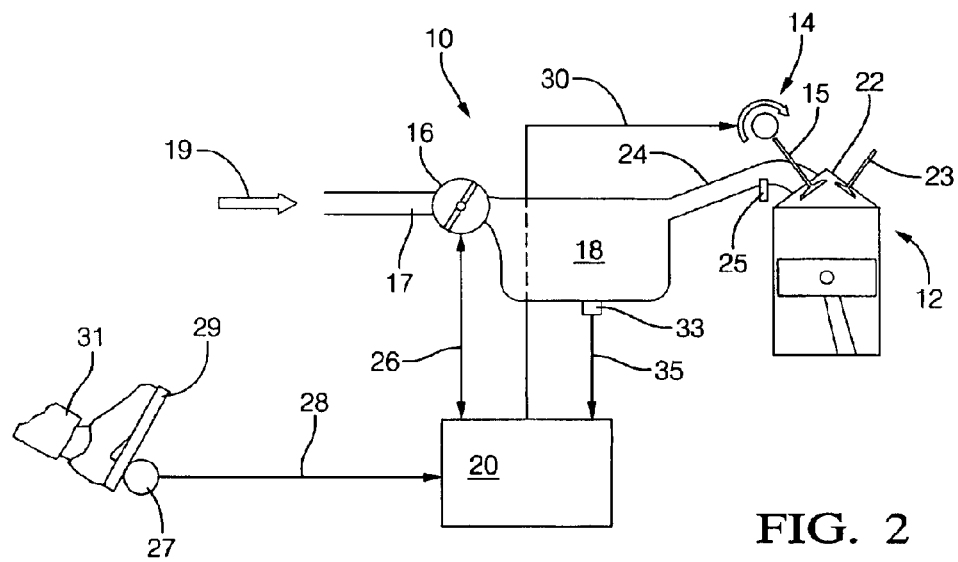
FIG. 2 is a schematic diagram of the engine shown in FIG. 1, showing a manifold vacuum control system in accordance with the invention.

Referring to FIG. 2, a vacuum system 10 in accordance with the invention includes an engine 12 and components substantially as shown in FIG. 1. In addition, a controllable vacuum-forming valve 16 is disposed in the entrance 17 to intake manifold 18 and is connected to ECM 20 by third leads 26 for sensing the rotary position thereof and for actuating valve 16 to move to a different rotary position in response to an algorithm in the ECM. Manifold 18 is further provided with a pressure sensor 33 connected to ECM 20 via fourth lead 35 for sensing pressure (vacuum) therein.

It has been found that fuel economy in engine 12 can be improved by providing a low level of vacuum in manifold 18. For any given operating condition, ECM 20 determines the proper vacuum for optimum fuel economy and automatically adjusts the rotary position of valve 16 and the lift of valve 15 to achieve the desired vacuum in manifold 18.

Figure 3:
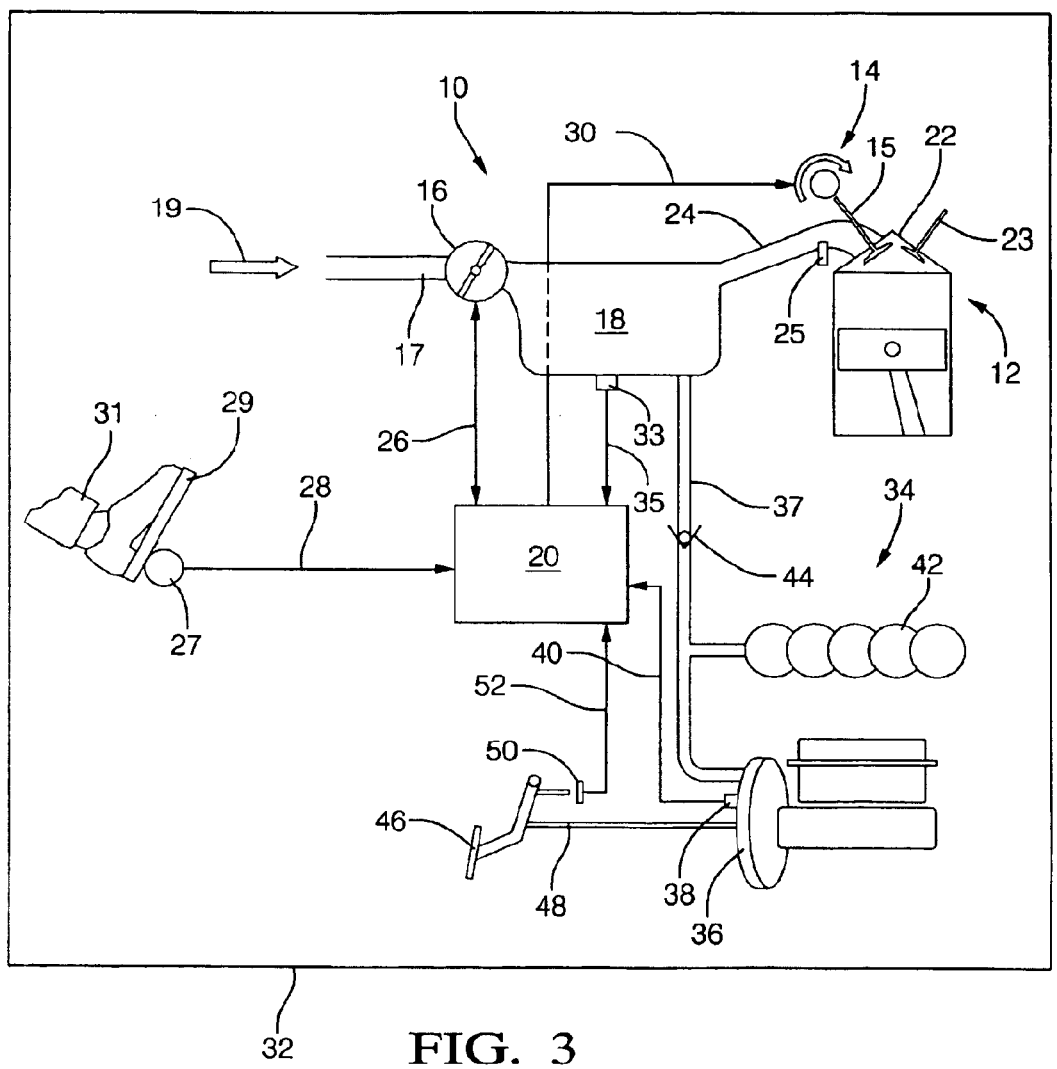
FIG. 3 is a schematic diagram like that shown in FIG. 2, showing the use of the manifold vacuum control system for vacuum-assisting of a vehicle braking system.

Referring to FIG. 3, vacuum system 10 is adapted to provide manifold vacuum for assisting in braking of a vehicle 32 in which system 10 and a vacuum-assisted braking system 34 are disposed.

Braking system 34 is connected to manifold 18 via a vacuum tube 37 and includes a conventional brake booster diaphragm 36 and a booster pressure sensor 38 connected via fifth lead 40 to ECM 20. Preferably, system 34 further includes an auxiliary vacuum tank 42 to increase the vacuum capacitance of the system and a check valve 44 disposed in tube 37 to prevent loss of vacuum from system 34 when pressure is increased in manifold 18 subsequent to a vacuum-forming event. Brake pedal 46 displaces brake rod 48 conventionally to engage diaphragm 36 and also engages brake switch 50 which is connected to ECM 20 by sixth lead 52. As described above, accelerator pedal 29 actuates electronic pedal module 27 connected to ECM 20 via second lead 28 for communicating therewith the request for engine load supplied by vehicle operator 31.

In operation, vacuum system 10 functions in a basic mode as described hereinabove for FIG. 2 to vary the rotary position of valve 16 while also adjusting the lift of valve 15 to optimize the level of vacuum in manifold 18 and the air flow across valve 15 for optimal fuel economy while controlling the torque of the engine in response to variations in position of accelerator pedal 29.

Under braking by operator 31, as indicated to ECM 20 by brake switch 50, the ECM determines if the engine speed is high enough and load is low enough that fuel injector 25 can be shut down to conserve fuel. This is known in the prior art. However, system 10 in accordance with the invention affords an opportunity to recharge booster diaphragm 36 and vacuum tank 42. If "deceleration fuel cut-off" (DFCO) is in effect, engaging vacuum valve 16 to increase manifold vacuum is not detrimental to fuel economy, as it would be during times of fueling to the cylinders. Thus, during periods of DFCO, the engine is heavily throttled by valve 16 and simultaneously variable valve lift means 14 is actuated to increase valve lift to preferably about a mid-range position, about 4 to 5 mm, to provide adequate flow area across the valve for evacuating intake manifold 18 and braking system 34. Vacuum generation during such periods is thus very high and results in no penalty in fuel economy.

Under milder braking conditions, and especially at low vehicle speeds, DFCO is not activated, and the just-described heavy throttling scheme will result in increased pumping losses and a negative impact on fuel economy. Therefore, under light braking conditions, a modified approach is indicated. ECM 20 continually polls the booster pressure sensor 38, preferably at about 125 millisecond intervals, and determines if booster vacuum is high enough to provide an adequate level of assist for instant braking. As long as sufficient vacuum exists in braking system 34, no throttling action of valve 16 is initiated by ECM 20. However, if booster vacuum is determined to be insufficient for safety or acceptable operator "feel," ECM 20 immediately actuates valve 16 and sets the lift of engine valve 15 to yield the desired torque as determined by position of the electronic pedal module 27 (with additions and substractions for various engine accessories). During such actuation, control of valve 16 and VVL means 14 must be closely synchronized to yield a smooth control of engine air flow. Preferably, a long-term learned integrator function is incorporated into the ECM algorithms to quickly establish the necessary throttling by valve 16 as a function of engine speed and load. Fine tuning of the position of valve 16 takes place based on feedback to ECM 20 of manifold pressure via lead 35.

ECM monitoring of brake pressure sensor 38 together with brake switch 50 can also provide diagnostic capability to sense vacuum leaks, provide appropriate fault codes, and enable engagement of failure mode countermeasures. For example, booster vacuum might decrease while intake manifold pressure remains constant and no braking maneuver is being executed. In such a case, the engine can be shifted automatically to a "throttled only" mode wherein VVL means 14 is locked to maximum valve lift, preferably about 10 mm, and valve 16 alone is used as in a conventional non-VVL-controlled engine to control engine load. In effect, the system adopts conventional throttled engine action until repairs can be implemented. If desired, ECM 20 can impose artificial limits upon the opening of valve 16 so that torque can be limited to a level which would motivate the driver not to ignore the instrument cluster's "Service Engine Soon" warning light.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for generating vacuum in an intake manifold in a fuel-injected internal combustion engine in a vehicle, the engine having variable valve lift as a primary throttle means for regulating engine load and having an engine control module for controllably varying valve lift, comprising the steps of:

a) providing a pressure sensor disposed in said intake manifold and connected to said engine control module for providing manifold pressure input to said engine control module;

b) providing a secondary throttle means disposed at an inlet to said intake manifold, connected to and controlled by said engine control module;

c) providing a vacuum capacitance tank connected to said intake manifold and an auxiliary vacuum activated system;

d) inputting vehicle deceleration information into said engine control module;

e) during said vehicle deceleration, at least partially closing said secondary throttle means to restrict the flow of air into said manifold and increasing the lift of said valves to pump air from said manifold through said engine, thereby generating manifold vacuum; and f) recharging said vacuum capacitance tank.

2. A method in accordance with claim 1 further comprising the step of stopping flow of fuel from at least one of the fuel injectors of said fuel-injection engine during said vehicle deceleration.

* * * * *